United States Patent [19]

Yamashita

[11] 3,804,241

[45] Apr. 16, 1974

[54] CARD IDENTIFYING METHOD

[75] Inventor: Hajime Yamashita, Yokohama, Japan

[73] Assignee: Ricoh Co., Ltd., Tokyo, Japan

[22] Filed: Nov. 28, 1972

[21] Appl. No.: 310,165

[30] Foreign Application Priority Data

Dec. 2, 1971 Japan .................... 46-97652

[52] U.S. Cl. .................... 209/110.5

[51] Int. Cl. .................... B07c

[58] Field of Search .................... 209/110.5, 80.5

[56] References Cited

UNITED STATES PATENTS

| | | | |
|---|---|---|---|
| 2,339,519 | 1/1944 | Rembold | 207/110.5 X |
| 2,424,053 | 7/1947 | Rembold | 209/110.5 X |
| 2,483,035 | 9/1949 | Burns | 209/110.5 X |
| 2,544,251 | 3/1951 | Block | 209/110.5 |
| 2,820,458 | 1/1958 | Koons | 209/110.5 |

FOREIGN PATENTS OR APPLICATIONS

| | | |
|---|---|---|
| 1,039,805 | 10/1953 | France |

*Primary Examiner*—Allen N. Knowles
*Attorney, Agent, or Firm*—Cooper, Dunham, Clark, Griffin & Moran

[57] ABSTRACT

A method of selecting a desired card from a large number of cards haphazardly stored in card case by inserting selectors in a plurality of sections of a plurality of notches formed in a marginal portion of each card. Each card is numbered and has a corresponding code mark in the form of narrowed-width portions in the corresponding sections of the corresponding notches of the card. When the selectors are inserted in the sections of the notches of all the cards corresponding to the positions of digits of the numeral given to the desired card as its code mark, the selectors catch against the narrowed-width portions of sections and cards having such portions are selected till the desired card is located. Insertion of the selectors is repeated a number of the times corresponding to the number of digits of the numeral given to the desired card as its code mark.

9 Claims, 4 Drawing Figures

CARD IDENTIFYING METHOD

BACKGROUND OF THE INVENTION

1. Field of the Invention

This invention relates to card identifying methods, and more particularly it is concerned with a card identifying method whereby a desired card is selected from among a number of cards, such for example as microfiche cards or microjacket cards haphazardly stored in a card case, and withdrawn from the case in accordance with an identifying code mark in the form of narrowed-width portions formed in outer portions of a plurality of sections of a plurality of notches formed in one marginal portion of each card.

2. Description of the Prior Art

Many items of visual information are nowadays stored in the form of microfilms. In this information storing system, various items of visual information are reducced in size into microfiche cards or microjacket cards. A large number of these cards can be stored in a small space, and some identifying system is used for identifying and retrieving a desired card from a large number of cards which are haphazardly stored in a card case.

In one card identifying method known in the art, a plurality of notches are formed in one marginal portion of each card and disposed in side by side relationship with each other. Each card is provided with a code mark in the form of a specific shape of a notch disposed in a selective position among the plurality of notches. According to this method, a desired card is selected mechanically by using selectors and inserting them in the notches of many cards till the desired card is located.

This method has a disadvantage in that the number of code marks used for identification is limited because the notches formed in one marginal portion of each card are small in number. Thus, this method is effective only when the number of cards from which a desired card is selected is relatively small. When the number of cards to be handled is large, it has hitherto been customary to divide the cards into a plurality of groups and attach a code to each card of different groups. This increases the cost and is not desirable economically.

SUMMARY OF THE INVENTION

This invention has as its object the provision of a card identifying method for selecting a desired card from among a number of cards haphazardly stored in a case by using a card identifying system wherein a code mark is in the form of narrowed-width portions formed in outer portions of a plurality of sections of a plurality of notches formed in one marginal portion of each card for inserting therein a plurality of selectors.

According to the invention, there is provided a card identifying method for selecting a desired card from among a number of cards haphazardly stored in a card case by using a card identifying system wherein the cards are each formed in a marginal portion thereof with a code mark in the form of narrowed-width portions selectively formed in outer portions of a plurality of sections of a plurality of notches disposed parallel to one another and cards having such anrrowed-width portions are adapted to be caught by selector rods which select those cards which have the narrowed-width portions in their notches by repeating the selecting operation a plurality of times till the desired card is located, such method comprising the steps of inserting a selector in outermost sections of corresponding sections of the corresponding notches of the cards according to the code mark given to the card to be identified and selecting those cards which have such narrowed-width portions in the outermost sections of the notches, and repeating such selector insertion operation a number of times corresponding to the number of the sections of the notches which have such narrowed-width portions till the desired card is located.

The method according to this invention permits code marks to be attached to a large number of cards, so that it is made possible to select a desired card from a collection of cards greater in number than a collection of cards from which a desired card has hitherto been selected. Thus, the present invention offers advantages over the prior art.

DESCRIPTION OF A PREFERRED EMBODIMENT

Figure 1:
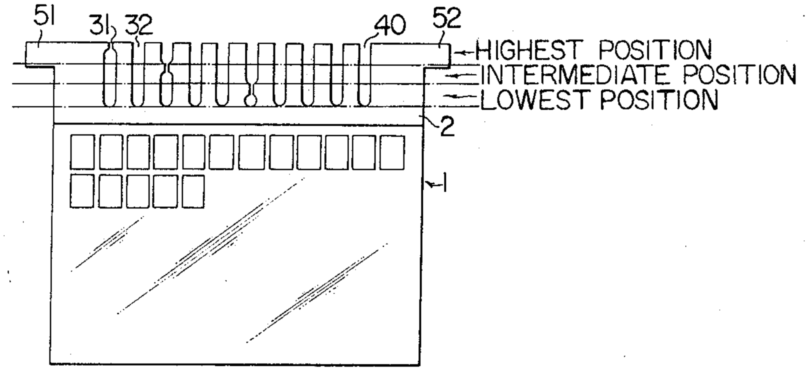
FIG. 1 is a plan view of a card adapted for use with the card identifying method according to this invention.

In FIG. 1, there is shown a card 1, either a microfiche card or a microjacket card, which is adapted for use with the method according to this invention. The card 1 is formed, in one marginal portion which contains no information, with a code bearing portion 2 in which a plurality of elongated notches 31, 32 . . . . 40 are formed at right angles to the edge and disposed parallel to one another. As shown, there are ten notches formed in the card, it being understood that the code mark placed on each card represents a numeral of the decimal notation system.

The notches 31 to 40 have substantially the same width and length and are each divided into a plurality of sections along the length thereof. When the code mark represents a numeral having three digits, the notches are all divided into three sections as shown in dash-and-dot lines in FIG. 1.

To distinguish one card from other cards or to provide a specific code mark to each card, the width of an outer portion of one section of each notch corresponding to one of the three digits of the numeral given to the card as its specific code mark is narrowed. For example, the card 1 shown in FIG. 1 has a code mark which represents the decimal number 136. The notches 31 to 40 of the card 1 are divided by dash-and-dot lines into three sections, an outer section representing the digit of the highest position or 1 in the number 136, an intermediate section the digit of the intermediate position or 3, and an innermost section the digit of the lowest position or 6. It will be seen that the width of the outer portion of the outermost section of the first notch 31, the width of the outer portion of the intermediate section of the third notch 33, and the width of the outer portion of the innermost section of the sixth notch 36 are narrowed, thereby indicating that the card 1 shown in FIG. 1 is represented by the card mark 136.

Figures 2, 3, 4:
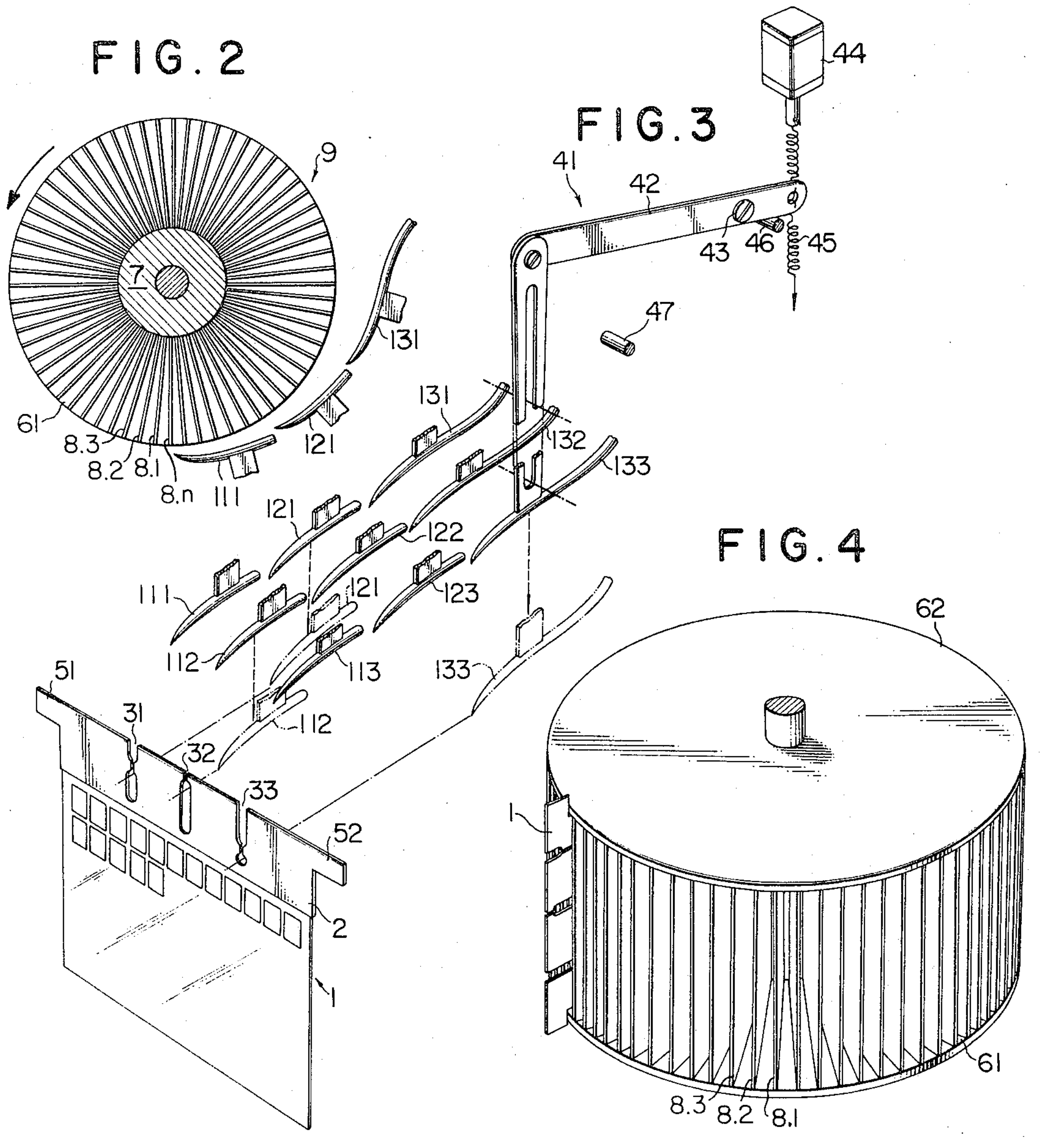
FIG. 2 is a plan view of one embodiment of the apparatus adapted to carry the method according to this invention into practice, with an upper supporter being removed from the apparatus in the interest of clarity.
FIG. 3 is a fragmentary perspective view of the apparatus shown in FIG. 2.
FIG. 4 is a perspective view of the apparatus shown in FIG. 2, with one card being stored therein.

When the code mark of the card 1 represents a numeral according to the ternary notation system and has three digits, three notches 31 to 33 are formed in the code mark portion 2 of the card 1 as shown in FIG. 3. The card shown in FIG. 3 has a code mark representing a numeral 213 of the ternary notation system. It will be seen that the width of the outer portion of the outermost section of the second notch 32, the width of the outer portion of the intermediate section of the first notch 31, and the width of the outer portion of the innermost section of the third notch 33 are narrowed. Projections 51 and 52 are formed at opposite ends of the code mark portion 2.

There is shown in FIG. 2 and FIG. 4, a card case 9 of the drum shape adapted for storing a number of cards 1 therein. The case 9 consists of a disk-shaped base plate 61, a disk-shaped supporter 62, and a rotatable shaft 7 coaxially connecting the base plate 61 and the supporter 62 together. A number of card holders 8.1 to 8.n are disposed radially in the card case 9 and pivotally connected to the shaft 7. The cards 1 are inserted in various card holders 8.1 to 8.n to be stored therein. The cards 1 are inserted in the card holders such that the code mark portion 2 of each card sticks out of the card holders.

Three sets of selectors each set comprising three selectors 111 to 113, 121 to 123 and 131 to 133 are provided for the notches 31, 32 and 33 of the card shown in FIG. 3 respectively and disposed in positions outside the card case 9. The number of the selectors used may vary depending on the number of digits of the numerals used as code marks and what is the notation scale of the numerals. It will be seen that the selectors are of the same shape and each include a plate-shaped portion smaller in thickness than the narrowed-width portions of the notches 31 to 33 and a shaft portion disposed in the lower portion of the plate-shaped portion and having a diameter larger than the diameter of the narrowed-width portions of the sections of the notches, so that when they are inserted in the sections of the notches which are formed with narrowed-width portions they catch against the edges of the notches. The selectors 111 to 113, 121 to 123 and 131 to 133 are disposed such that they are inserted in the outermost sections, intermediate sections and innermost sections respectively of the notches 31 to 33 formed in the cards stored in the card case 9 to catch against the narrowed-with portions of the cards for identification purposes. Electro-magnetic means 41 or other drive means is selectively actuated in accordance with the code mark of the card to be located so as to move the selectors to their respective operative positions shown in broken line in FIG. 3.

When a card provided with a code mark representing a numeral 213 of the ternary notation system as shown in FIG. 3 is to be located, the shaft of the card case 9 is rotated by some drive mechanism in the direction of an arrow in FIG. 2 and a selector 112 for the digit of the highest position in the numeral or the code mark given to the card to be located is moved to a position in which it is disposed in the path of movement of the outermost sections of the notches 32 of the cards in the card case 9. As the card case 9 rotates about the shaft 7, cards whose code marks have in the highest position the same digit as the digit in the highest position of the code mark of the desired card are caught and selected by the selector rod 112 and withdrawn by being moved along the selector from the card case 9 by the energy or rotation of the cards.

Another selector 121 for the digit of the intermediate position in the numeral or the code mark given to the card to be located is moved to a position in which it is disposed in the path of movement of the intermediate sections of the notches 31 of the cards selected by the selector 112. As the card case 9 rotates, cards whose code marks have in the intermediate position the same digit as the digit in the intermediate position of the code mark of the desired card are caught and selected by the selector 121 from the cards selected by the selector 112 and withdrawn by being moved along the selector 121 further outwardly from the card case 9 by the energy of rotation of the cards.

Still another selector 133 for the digit of the lowest position in the numeral or the code mark given to the card to be located is moved to a position in which it is disposed in the path of movement of the innermost sections of the notches 33 of the cards selected by the selector 121. As the card case 9 rotates, a card whose code mark has in the lowest position the same digit as the digit in the lowest position of the code mark of the desired card are caught and selected by th selector 133 from the cards selected by the selector 121 and withdrawn by being moved along the selector 133 further outwardly from the card case 9 by the energy of rotary movement of the card. This is the desired card.

When a card provided with a code mark representing a numeral 136 of the decimal notation system as shown in FIG. 1 is to be located, three sets of selectors each set comprising ten selectors are employed for catching and selecting the desired card. The first selector of the first set is moved to a position in which it is disposed in the path of movement of the outermost sections of the notches 31 of the cards in the card case 9. As the card case 9 rotates about the shaft 7, cards whose code marks have in the highest position the same digit as the digit in the highest position of the code mark of the desired card are caught and selected by the first selector of the first set and withdrawn by being moved along such selector from the card case 9 by the energy of rotation of the cards.

The third selector of the second set is moved to a position in which it is disposed in the path of movement of the intermediate sections of the notches 33 of the cards selected by the first selector of the first set. As the card case 9 rotates, cards whose code mark have in the intermediate position the same digit as the digit in the intermediate position of the code mark of the desired card are caught and selected by the third selector of the second set and withdrawn further outwardly from the card case 9.

A sixth selector of the third set is moved to a position in which it is disposed in the path of movement of the lowest sections of the notches 36 of the cards selected by the third selector of the second set. As the card case 9 rotates, a card whose code mark has in the lowest position the same digit as the digit in the lowest position of the code mark of the desired card is caught and selected by the sixth selector of the third set and withdrawn further outwardly from the case 9 by the energy of rotation of the card. This is the desired card.

The drive means 41 is shown in FIG. 3 as driving the selector 133. It is to be understood that other selectors are driven by the same mechanism as drive means 41. The selector 133 is pivotally supported by one end of a lever 42 which in turn is pivotally supported substantially in the middle portion by a shaft 43. The lever 42 is connected at the other end thereof to a movable rod of a solenoid 44. A return spring 45 is mounted between the lever 42 and an immovable member.

When a selector switch is depressed, a current is supplied to the solenoid 44 to energize the same. Upon energization of the solenoid 44, the lever 42 is actuated to move the selector 133 to its operative position. The scope of angular rotation of the lever 42 is limited by stoppers 46 and 47.

The sets of selectors which correspond in number to the digits in the numeral or the code mark given to the card to be selected may be arranged in spaced apart relationship or may partly overlap one another.

While the invention has been shown and described as being used with cards provided with code marks in the form of a numeral of the decimal notation system or the ternary notation system, it is to be understood that the invention is not limited to the code marks of any particular notation system, and that the invention may be used with cards having code marks in the form of a numeral of any notation system. Different code systems may be provided along the length of each notch formed in the cards.

The card case 9 has been shown and described as being cylindrical in shape so as to arrange radially the cards contained therein, but the card case may be constructed such that the cards are arranged on a straight line. In this case, the drive mechanism for the card case is made to operate to move the cards in the direction in which it is disposed.

What I claim is:

1. A card identifying method for selecting a desired card from among a number of cards haphazardly stored in a card case by using a card identifying system wherein the cards are each formed in a marginal portion thereof with a code mark in the form of narrowed-width portions selectively formed in outer portions of a plurality of sections of a plurality of notches disposed parallel to one another and cards having such narrowed-width portions are adapted to be caught by selectors which select those cards which have the narrowed-width portions in their notches by repeating the selecting operation a plurality of times till the desired card is located, such method comprising the steps of a. disposing a plurality of selectors, corresponding in number to the aforesaid plurality of notch sections, for insertion in respectively different sections of notches at predetermined positions corresponding to the code mark given to the card to be located;

b. inserting one of said plurality of selectors in outermost sections of the corresponding notches according to the code mark given to the card to be located and selecting those cards which have such narrowed-width portions in the outermost sections of the notch, and c. repeating such selector insertion, in notches of only those cards selected by the last previously inserted selector, with the remainder of said plurality of selectors, till the desired card is located.

2. A card identifying method as set forth in claim 1 further comprising the step of mounting said number of cards haphazardly in a card case which is rotatable such that the cards are disposed radially in the card case with their code mark bearing marginal portions being disposed out of the card case and rotating said card case while the selectors are inserted in the corresponding sections of the corresponding notches according to the code mark given to the card to be located.

3. A card identifying method as set forth in claim 1 further comprising the step of moving the selectors to operative positions by drive means according to the code mark of the card to be located.

4. A card identifying method as set forth in claim 1 wherein said selectors are in rod form.

5. A method for selecting a desired card from an array of cards regardless of the order of the cards in the array, each card having in one margin a plurality of parallel notches with locally constricted portions formed at respectively different predetermined levels in selected ones of the notches and representing a code designation for the card, all of the cards being identical in number and position of notches but different cards having different positional arrangements of the constricted portions, said method comprising:

a. advancing the array of cards along a defined path transverse to the major surfaces of the cards with the notch-bearing margins of the cards aligned such that corresponding notches of successive cards are in register;

b. at a first locality in said path, inserting a first guide member in a predetermined one of the notches of the successive advancing cards for engagement with constricted portions formed therein at the highest of said predetermined levels to selectively partially withdraw from the array each card having a constricted portion at said highest level in said last-mentioned predetermined notch by guiding each said card out from the array as the card is advanced in said path beyond said first locality; and c. at a second locality in the path beyond said first locality, inserting a second guide member in a predetermined one of the notches of the cards selectively partially withdrawn by said first member for engagement with constricted portions formed therein at a second level below said highest level, to selectively partially further withdraw from the array each card having a constricted portion at said second level in said last-mentioned predetermined notch, by guiding the card outwardly from the array as the card is advanced in said path beyond said second locality.

6. A method according to claim 5, wherein each of said cards has locally constricted portions formed at more than two respectively different predetermined levels, and wherein a number of guide members equal to the number of said levels are positioned in succession along the path of advance of said cards, each of said guide members beyond the first guide member being disposed for insertion in a predetermined one of the notches of the cards selectively partially withdrawn from the array by the immediately preceding one of said guide members for engagement with constricted portions formed therein at a level lower than the level of constricted portions engaged by the immediately preceding guide member, to selectively partially further withdraw from the array each card having a constricted portion in said last-mentioned predetermined notch at the aforesaid lower level for engagement with the guide member as aforesaid, by guiding the card outwardly from the array as the card continues to advance in said path.

7. A method according to claim 5, wherein a first set of guide members equal in number to the number of notches on each card and respectively corresponding thereto are movably supported in parallel array adjacent said path at said first locality for register with their respectively corresponding notches, wherein the step of inserting said first guide member comprises moving a selected one of said first set of guide members corresponding to a predetermined one of said notches into said path in position for insertion in said last-mentioned predetermined notch of the successive cards advancing in said path past said first locality, wherein a second set of guide members equal in number to the number of notches on each card and respectively corresponding thereto are movably supported in parallel array adjacent said path at said second locality for register with their respectively corresponding notches, and wherein the step of inserting said second guide member comprises moving a selected one of said second set of guide members corresponding to a predetermined one of said notches into said path in position for insertion in said last-mentioned predetermined notch of the successive cards advancing in said path past said second locality.

8. A method according to claim 7 wherein the step of advancing the array of cards comprises disposing the cards radially in a rotatable card holder with the notch bearing margins of the cards positioned around the circumference of the card holder and disposed for engagement with the first guide member, and rotating the card holder in such direction that the notch bearing margin of each card successively traverses said first and second localities.

9. A method according to claim 8, wherein each of said notches is of substantially uniform width except at a constricted portion, wherein each of said guide members is of elongated rodlike configuration having a diameter less than the normal width of one of said notches but greater than the width of a constricted portion of the notch, each of the guide members extending generally along the path of advance of said cards and having a nose portion positioned for insertion into a notch immediately below the level of the constricted portion to be engaged by the guide member, each of said guide members further sloping outwardly from the path of card advance in the direction of card advance so that a card having a constricted notch portion engaged by the guide member is moved radially outwardly from the card holder as rotation of the card holder carries the card progressively past the guide member with the guide member engaging the constricted portion as aforesaid.

* * * * *